United States Patent [19]

Delamare

[11] Patent Number: 4,856,827
[45] Date of Patent: Aug. 15, 1989

[54] RESILIENT BALL JOINT SUPPORT

[75] Inventor: Guy-Robert Delamare, Herblay, France

[73] Assignee: Institut Francais du Petrole, Rueil Malmaison, France

[21] Appl. No.: 940,486

[22] Filed: Dec. 10, 1986

[30] Foreign Application Priority Data

Dec. 11, 1985 [FR] France .................. 85 18569

[51] Int. Cl.⁴ .................. F16L 27/04; F16C 11/06
[52] U.S. Cl. .................. 285/268; 285/900; 403/120; 403/132; 405/202; 166/355
[58] Field of Search .................. 166/355, 350; 175/5, 175/7, 8; 285/261, 268, 225–228, 167, 269, 900; 405/202, 195; 403/76, 122, 120, 5, 31, 132, 50, 51, 144; 188/269, 298, 322.19; 267/122, 141.1, 64.27, 64.26; 248/631, 562, 636, 607

[56] References Cited

U.S. PATENT DOCUMENTS

| | | | |
|---|---|---|---|
| 1,217,507 | 2/1917 | Sanford | 267/64.27 |
| 1,821,274 | 9/1931 | Plummer | 285/261 |
| 1,888,026 | 11/1932 | Chapman | 285/225 X |
| 2,056,106 | 9/1936 | Kuhn | 267/64.27 |
| 2,704,665 | 3/1955 | Zoltak | 267/64.27 |
| 2,773,686 | 12/1956 | Nash | 267/64.27 |
| 3,120,382 | 2/1964 | Paulsen | 403/51 |
| 3,162,164 | 12/1964 | Eck | 248/631 |
| 3,219,365 | 11/1965 | Webb | 285/261 |
| 3,433,504 | 3/1969 | Hanes | 285/264 X |
| 3,682,431 | 8/1972 | Vivian | 248/631 |
| 3,722,875 | 3/1973 | Hasse | 267/122 |
| 3,746,372 | 7/1973 | Hynes et al. | 285/900 X |
| 3,984,990 | 10/1976 | Jones | 166/350 |
| 4,165,107 | 8/1979 | Affa et al. | 285/226 |
| 4,489,962 | 12/1984 | Caumont et al. | 285/268 |
| 4,523,612 | 6/1985 | Kuklo | 285/226 X |
| 4,643,463 | 2/1987 | Halling et al. | 285/226 |

*Primary Examiner*—Bruce M. Kisliuk
*Attorney, Agent, or Firm*—Antonelli, Terry & Wands

[57] ABSTRACT

A resilient ball joint support is provided including two plates movable with respect to each other and connected together by at least one ball joint, the transmission of a load between said plates being provided, partly through at least one cushion formed of at least one sealed envelope confining at least one fluid which is pressurized by the action of said load and partly by at least one ball joint centering said plates with respect to each other.

19 Claims, 11 Drawing Sheets

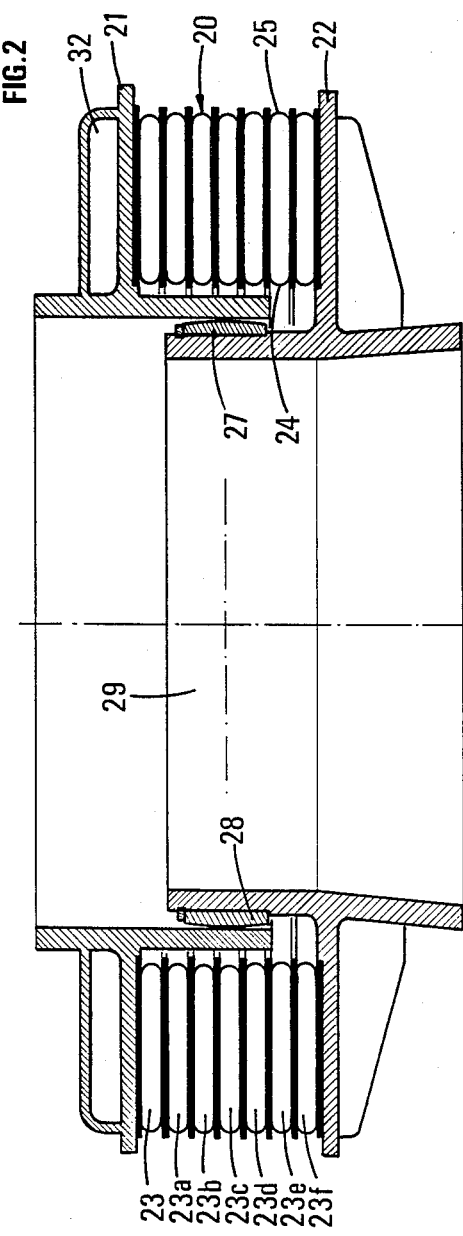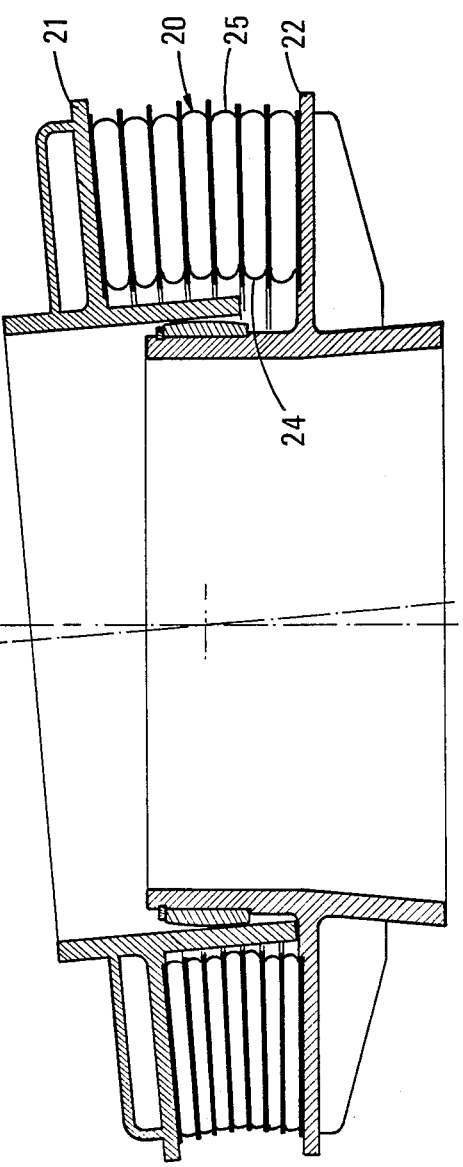

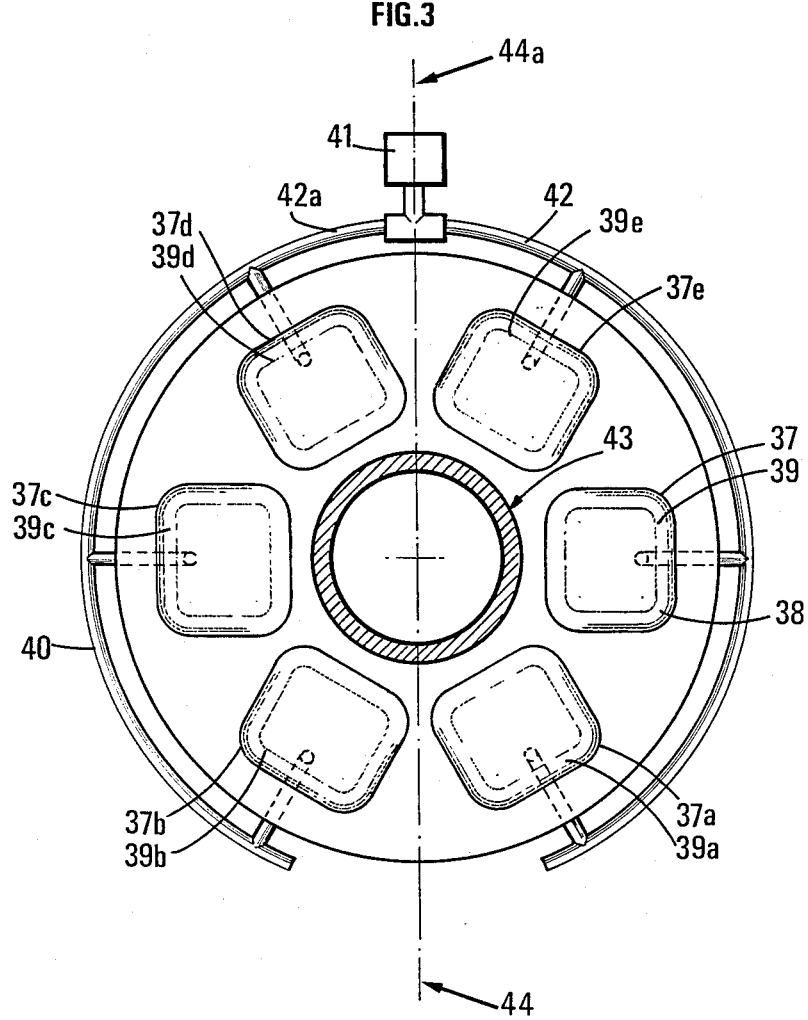

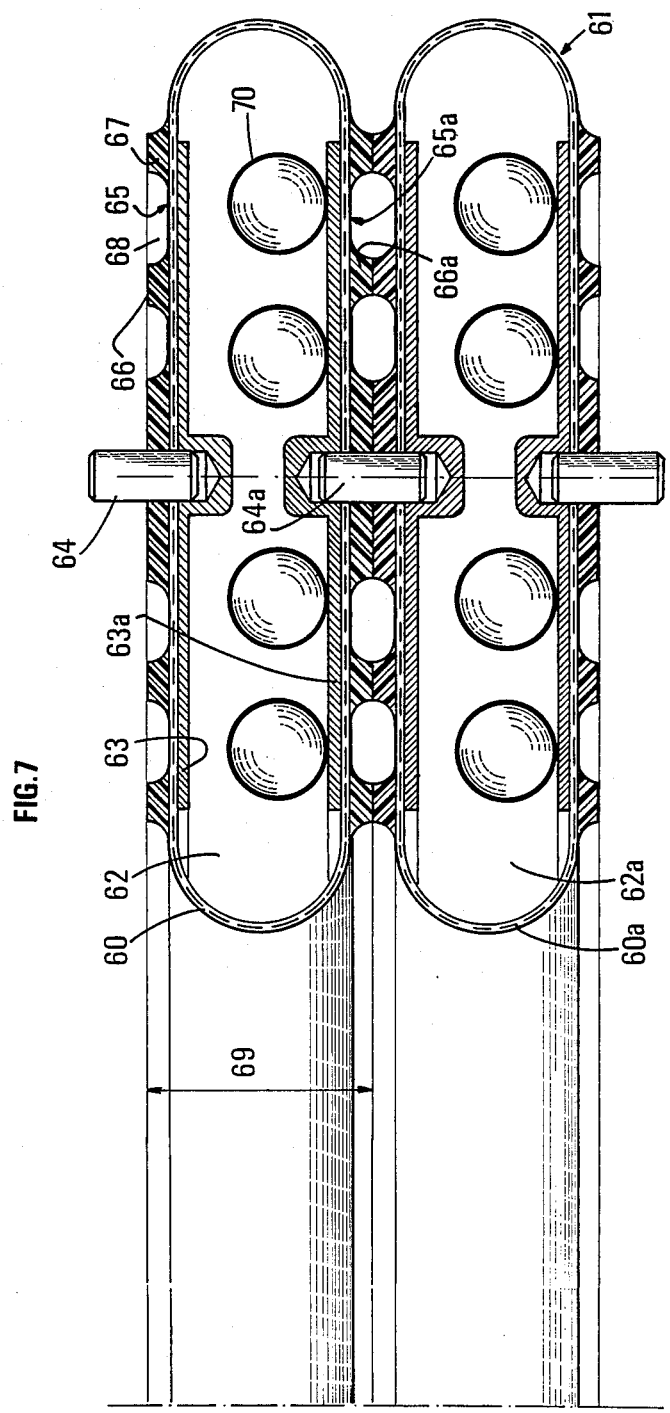

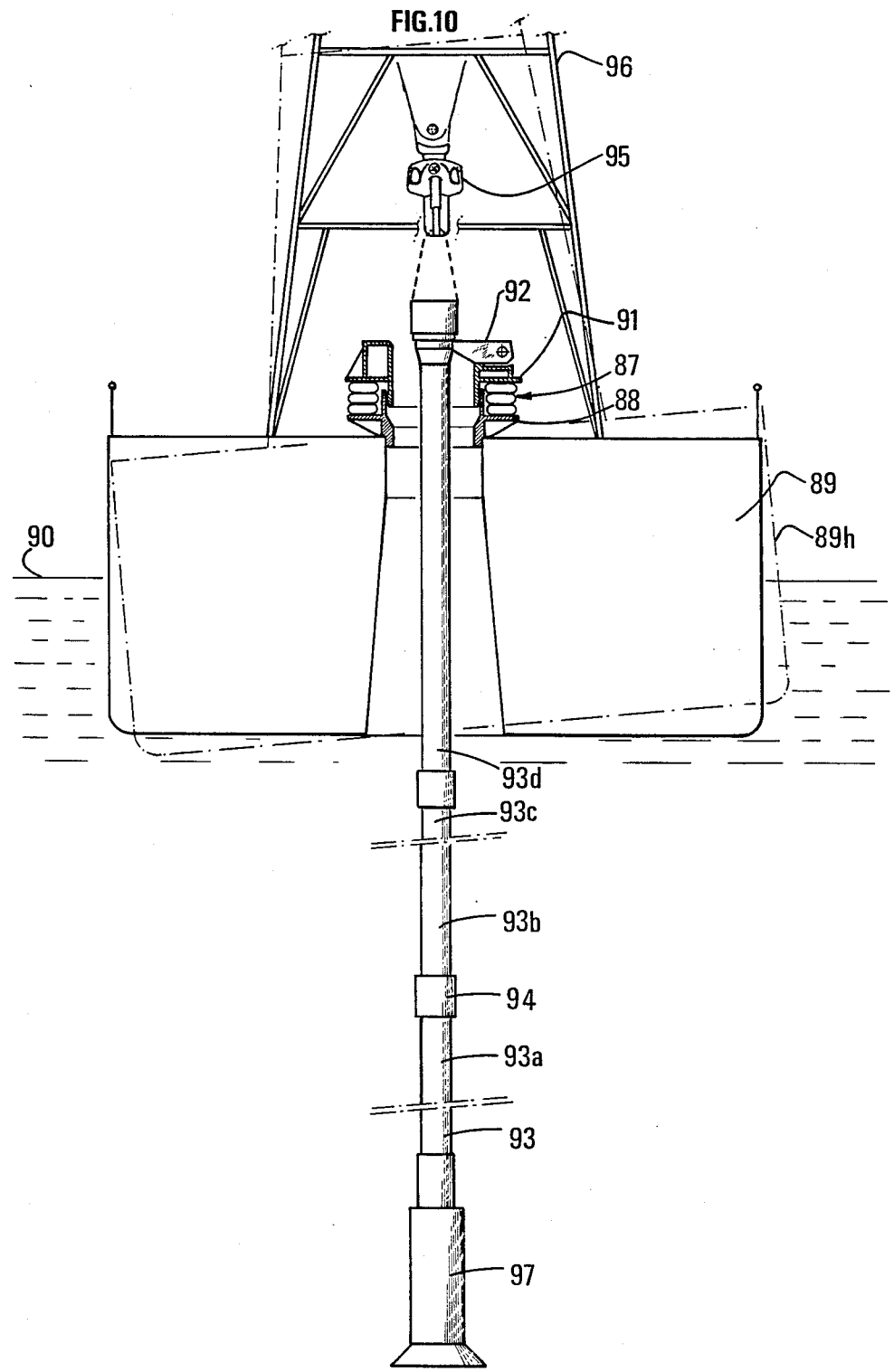

RESILIENT BALL JOINT SUPPORT

BACKGROUND OF THE INVENTION

1. Field of the Invention

The present invention relates to a resilient ball joint support which, when it is interposed between a mobile load and a structure supporting this load, provides both absorption of energy at the time of placing the load and a nutational freedom of movement of the load with respect to the load supporting structure.

Generally, the resilient ball joint support of the present invention is applied to supporting and handling heavy loads which must remain nutationally mobile with respect to their support structure. It is more particularly adapted to use on ships or sea platforms, for suspending swinging loads, for example, or equipment connected to the bottom of the sea, when the support structure is subjected to the movements of the swell.

2. Description of the Prior Art

Support structures are already known allowing a freedom of movement of the load in nutation, such as ball joint shoes, in sliding contact between two spherical surfaces, or such as spherical stratified rubber or metal stops.

Stratified spherical stops of this type are described for example in French Pat. Nos. 80/15 454 and 2.370. 900.

This freedom of movement is obtained in this case at the cost of high angular stiffness of the system, resulting either from a coefficient of friction difficult to reduce or from the rigidity under shearing of the elastomer plates which must have a sufficient area for supporting heavy loads.

These systems in addition do not provide energy absorption at the time of setting down the load.

A more improved system exists, described, for example, in the U.S. Pat. No. 3 984 990, which results from the association of a ball joint with a series of actuating cylinders disposed about a circle concentric with the ball joint and whose chambers are caused to intercommunicate by connecting pipe means.

Such a system provides absorption of energy at the time when the load is set down, but has the drawback of requiring a large number of precise mechanical parts, subject to wear and to corrosion and requiring constant maintenance. For supporting heavy loads it requires the use of very high hydraulic pressures and, ensuring the pinpoint transmission of loads, produces high local force concentrations in line with the cylinder fastenings.

On the other hand, the device of the invention allows the heavy loads to be absorbed over a large area with a relatively low fluid pressure, and with the major parts of its components, made from flexible materials, being insensitive to corrosion, wear and fatigue and require no maintenance.

SUMMARY OF THE INVENTION

The device of the present invention behaves substantially like a ball joint and like a shock absorbing cylinder, the two functions being combined in the same member. The device of the invention further provides good centering of the elements or plates of the articulation.

The present invention provides particularly a resilient ball joint support formed of two plates movable with respect to each other and connected together by at least one ball joint, wherein the transmission of the load between said plates is provided, for one part, through at least one cushion formed of at least one sealed envelope confining at least one fluid which is pressurized by the action of said load and, for another part, by at least one ball joint centering said plates with respect to each other.

BRIEF DESCRIPTION OF THE DRAWINGS

The features and advantages of the invention will be better understood from reading the following description of embodiments, with reference to the accompanying drawings in which:

FIG. 2 is a vertical sectional view along an axis of another embodiment of the support of the invention with an annular cushion, FIG. 2A is a vertical sectional view along this axis of this same embodiment in the slanted position, FIG. 3 is a horizontal sectional view perpendicular to an axis of another embodiment of the support of the invention with multiple separate and intercommunicating cushions, FIG. 7 is a partial vertical sectional view along an axis of another embodiment of the support of the invention where the different envelopes containing the cushion are independent and have integrated shock absorbing means, FIG. 10 is a cross sectional view of a ship including a support of the invention used for suspending a riser for drilling the under sea subsoil.

DESCRIPTION OF THE PREFERRED EMBODIMENT

Figure 1:
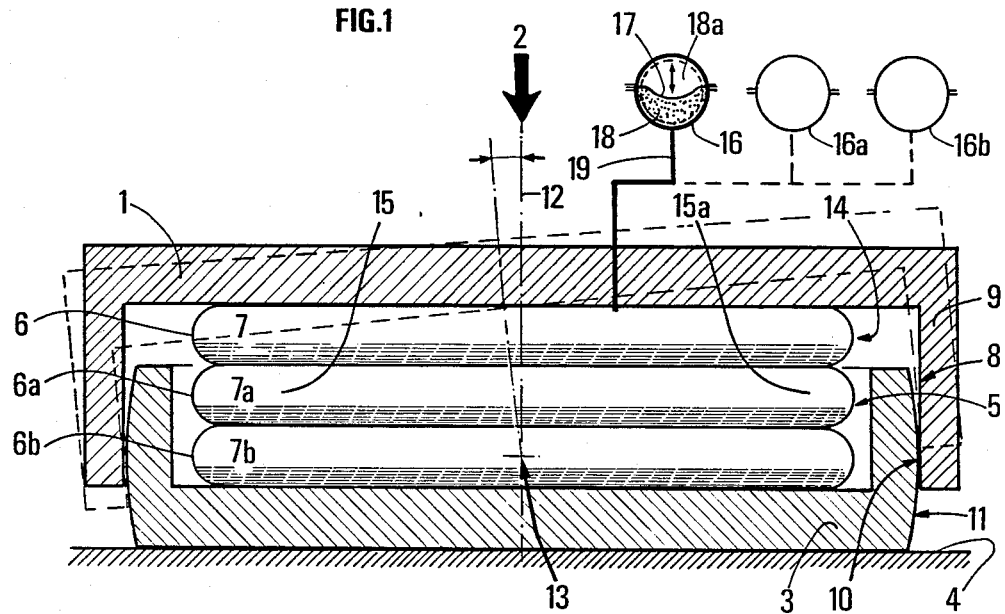
FIG. 1 is a vertical sectional view along an axis of a support in accordance with the invention having a circular cushion.

Referring now to the drawings wherein like reference numerals are used throughout the various views to designate like parts and, more particularly, to FIG. 1, according to this figure, a support constructed in accordance with the present invention includes an upper plate 1 which is, for example, a plate receiving a load designated by the arrow 2, with the upper plate 1 being separated from a lower plate 3 which, for example, may represent a plate bearing on a carrying structure 4, through a cushion 5 formed of a plurality of flexible envelopes 6, 6a, 6b confining fluid capacities 7, 7a, 7b which are pressurized by the load 2. The two plates 1, 3 of the support are held facing each other by a ball joint 8 which results, for example, from a cooperation of a sleeve 9, integral with the plate 1 and including a bore 10 with a spherical drum 11 integral with the lower plate 3, centered inside the bore 10. By this arrangement, a restricted mobility of the two plates 1, 3 with respect to each other is obtained, The plates 1, 3 may move together and away from each other and, for example, the axis of the plate 1 may describe a nutational movement with respect to the center of the spherical drum 11 of the plate 3.

It is advantageous in this case for the cushion 5 to have a circular shape whose axis 12 passes through the center 13 of the ball joint 8. In this case, the side walls such as 14 of envelopes 6, 6a, 6b assume, under the effect of pressurizing of the fluid in the capacities 7, 7a, 7b a toroidal shape in which the radius of curvature of all the vertical radial sections may vary because of the pliancy of the material which forms them, so as to allow the above described freedom of relative movement of the two plates 1, 3.

However, if the capacities 7, 7a, 7b contain a substantially incompressible fluid, such as, for example water, whose volume will remain substantially constant whatever the load 2 applied to the support, the two plates 1, 3 cannot draw close to one another but on the other hand they may oscillate with respect to one another.

In this case, the liquid contained in the zone 30 of, for example, the cushion 15, where the two plates 1, 3 draw together will be driven, without causing an appreciable resistance to the zone, such as 15a, in which these two plates move away from each other. The radius of curvature of the two toroidal side walls of envelopes 6, 6a, 6b will decrease in zone 15, whereas, it will increase in zone 15a.

On the other hand, if the capacities 7, 7a, 7b contain a compressible fluid, such as air, or a mixture of compressible and incompressible fluids in appropriate proportions, the two plates 1, 3 may move together under the effect of an increase of the load while causing an increase of the pressure in the capacities 7, 7a, 7b and, correspondingly, a reduction of the volume of the gas.

If a load propelled with a certain speed, so carrier of a certain amount of kinetic energy, is set down on plate 1, this latter will draw closer to plate 2 until the pressure of the fluid in capacities 7, 7a, 7b has risen to a value such that the load is checked. The coming together of the two plates causes a stroke absorbing the shock of the load and the impact force will be all the smaller the larger the stroke.

In practice, it is advantageous to use an incompressible fluid, such as water, for filling capacities 7, 7a, 7b and to associate therewith at least one supplementary capacity, such as, for example, an oleopneumatic accumulator 16, 16a, 16b having a membrane 17 separating the lower part 18 in communication with the capacities through a pipe 19 from the upper part 18a containing a gas, such as air or nitrogen, whose pressure may be adjusted to a predetermined value. The preset pressure is advantageously different from each of the oleopneumatic accumulators 16, 16a, 16b, even staggered from one to another. FIG. 2 shows a first embodiment of the support of the invention where the cushion 20 interposed between the plates 21 and 22 is formed of the superimposition of annular envelopes 23 to 23f, whose inner 24 and outer 25 edges take on a toroidal shape under the effect of pressurization of the fluid which they confine.

Plates 21 and 22 are centered with respect to each other by the ball joint 27 located inside the cushion 20 and, advantageously, the center of a spherical drum 28 is on the axis of the annular envelopes 23 to 23f and in a plane situated at substantially centrally of the cushion 20.

In this case, as will be seen further on, it is advantageous for plate 22 to have at its center a circular orifice 29 so that the general shape of said support is annular and forms a well.

Figure 6:
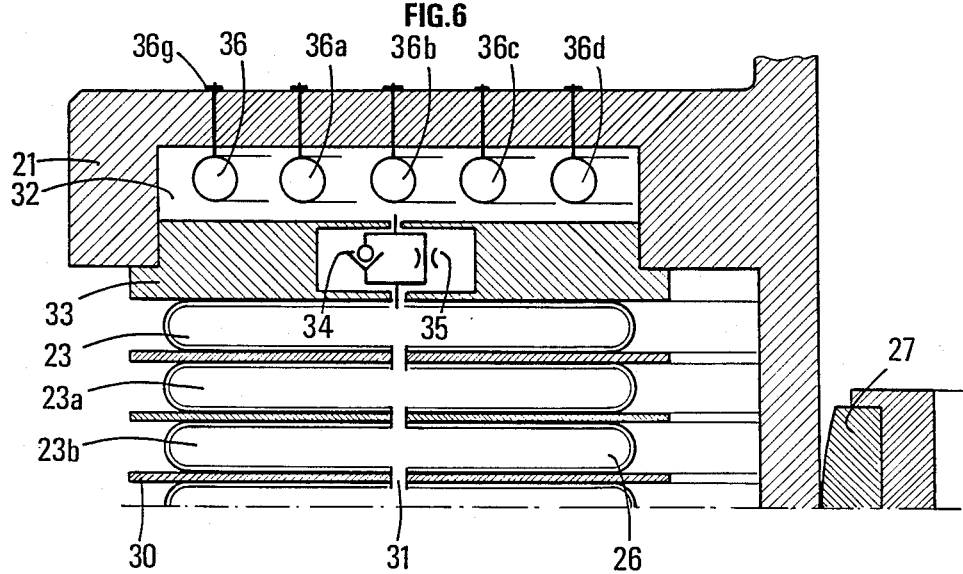
FIG. 6 is a vertical sectional view along the axis of an annular support of the invention, showing a detail of construction of the fluid cushion shown in FIG. 2.

As in FIG. 6. the annular envelopes 23 to 23f are separated by annular plates 30 formed with orifices 31 communicating the different capacities confined by the annular envelopes 23-23f.

Inside a plate 21 is formed a cavity 32 which is filled with the same incompressible liquid as the capacity 26 of cushion 20, from which it is separated by the annular plate 33 which has communications orifices shown symbolically at 34 and 35.

In the cavity 32 is housed at least one flexible sealed and flattenable sleeve 36, 36a, 36b, 36c, fixed, for example to plate 21 by an inflation valve 36g. The flexible sleeve is inflated with a gas, such as air or nitrogen, to a pressure forming an initial setting.

Under the effect of an increase of the load supported by the support, producing an increase of the pressure of the liquid contained capacities 26 and cavity 32 and surrounding the flexible sleeve 36, this latter is flattened, the volume of the gas which it contains being reduced.

Thus, if a load is set down on plate 21 propelled with a certain speed, therefore carrier of a certain amount of kinetic energy, the plate 21 will close up to plate 22 until the pressure of the fluid (liquid and gas) has risen to a value such that the load is checked.

During this closing movement of the two plates 21, 22, the liquid contained in capacity 26 will be driven towards cavity 32 through the orifices 34 and 35.

Orifice 34 is a non return valve which leaves a wide passage from 26 to 32 and prevents the return from 32 to 26, so that such return is only possible through the orifice 35 which is a nozzle whose small section causes a braking of the return fluid generated by the resilience of the pressurized gas capacities contained in the flexible sleeves and avoids bouncing of the load set down on the support.

The different envelopes 23, 23a, 23b, shown in FIG. 6 are produced from at least one layer of cables disposed in a substantially radial direction and embedded in a sheet of a flexible sealed mate rial to which they are bonded. Each of these envelopes, such as, for example 23a, is connected to another envelope of cushion 20 which is adjacent thereto, such as, for example 23b, by a rigid material membrane 30, to which they are fixed by bonding.

The cables forming the envelopes 23, 23a, 23b may be advantageously formed from polyamide, polyester, kevlar, glass or steel wires and the flexible material forming the sheets wrapping these cables, and which ensure the cohesion of the wall of the envelopes and the sealing thereof, may be advantageously made from an elastomer such as neoprene, nitrile, butyl or natural rubber gum, or else a thermoformable plastic material such for example as polyvinyl chloride or polyurethane.

Advantageously, the above mentioned layers of cables may be woven together and form a coated fabric.

FIG. 2A shows the same support as FIG. 2, plate 21 being slanted with respect to plate 22, which causes the deformation of cushion 20 so as that the radii of the vertical radial sections of the flexible inner 24 and outer 25 toroidal walls of the envelopes are constantly variable along their perimeter.

In FIG. 3, a second embodiment of the resilient ball joint support of the invention is illustrated, including a plurality of cushions 37 to 37e formed of the superimposition of sealed envelopes disposed side by side about the ball joint 43 over a circle substantially concentric therewith. Each elementary cushion may advantageously have a rectangular shape, so that the flexible wall 38 of each envelope which forms it assumes a semi-cylindrical shape on pressurization of the fluid which it confines.

The six capacities 39 to 39e defined by the six groups of envelopes forming the six cushions 37 to 37e, intercommunicate with each other through the pipe 40 on which the isolating valve 41 is mounted.

By way of example, the valve 41 is disposed at mid length of the intercommunication pipe 40 so that the three cushions 37e, 37 and 37a are connected to the section 42 of this pipe situated on the same side of the valve and of the plane of symmetry 44 of the support, whereas the other three cushions 37b, 37c and 37d are connected to the second section 42a situated on the other side of plane 44.

It will be readily understood that the support may freely oscillate about a horizontal axis 44a contained in plane 44 and passing through the center of the ball joint 43 if the liquid contained in the capacities 39e, 39 and 39a of cushions 37e, 37 and 37a whose height and volume decrease, may be driven towards the capacities 39b, 39c and 39d of cushions 37b, 37c and 37d whose height and volume increase, through the pipe 40 when valve 41 is in the open position.

When this valve is in the closed position, no transfer of fluid is possible between the cushions situated on each side of plane 44 and any pivoting of the support about axis 44a is impossible.

Thus, the mobility of the support may be controlled by valving a fluid flow.

It will be readily understood that by inserting in the intercommunication pipe known fluid flow regulation devices, such as calibrated overpressure valves, slide valves, pressure controlled vales, etc., programming may be provided which will control the freedom of movement of the support.

Figure 4:
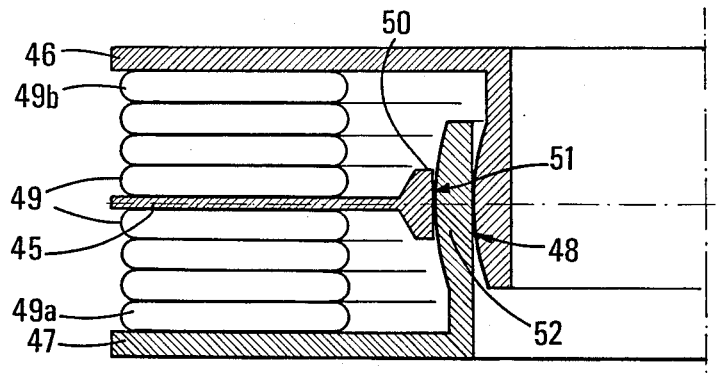
FIG. 4 is a vertical sectional view along an axis of another embodiment of the support of the invention including an intermediate plate.

FIG. 4 shows a third embodiment of the support of the invention, where an intermediate plate 45 is inserted between the two plain plates 46 and 47 centered with respect to each other by the ball joint 48.

This intermediate plate is separated from the main plates by two sections 49a and 49b of the cushion 49 and is centered with respect to plane 47 by a second ball joint 50. Advantageously, the second ball joint 50 may be formed by the association of a bore 51 formed at the center plate 45 with a spherical drum 52 carried by plate 47.

When the two main plates 46 and 47 are slanted with respect to each other, the intermediate plate limits the transverse deformation of cushion 49 by providing stabilizing anchorage at mid height thereof.

In fact, under the effect of the slant of one plate 46 or 47 with respect to the other, an imbalance appears in the cushion 49, due to the fact that the uniform pressure of the fluid which it contains is exerted over a larger area on the side where its height increases and over a smaller area on the opposite side where it decreases.

Bending on the cushion 49 results therefrom which then subjects the walls on the envelopes which form it to high forces. Therefore, the interpositioning of an intermediate plate such as, for example, the plate 45 allows cushions to be provided of greater thickness allowing greater angular movements.

Figure 5:
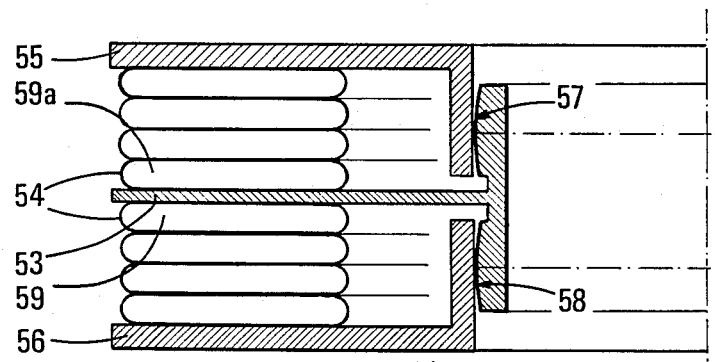
FIG. 5 is a sectional view along a vertical axis of another embodiment of the support of the invention, comprising two centering ball joints.

FIG. 5 shows a fourth embodiment of the support of the invention which also includes an intermediate plate 53 for stabilizing the cushion 54, but the plate 53 is centered with respect to the two main plates 55, 56 by two ball joints 57, 58. It will be readily understood that when the two plates 55, 56 are slanted with respect to each other, the two envelopes 59 and 59a, fixed to this plate 53, transmit thereto the transverse forces due to the deformation of cushion 54, these forces being transmitted to the two main plates 55, 56 by the ball joints 57 and 58.

FIG. 7 shows a detail of construction of another embodiment of the resilient support of the invention where the different envelopes 60 and 60a, of cushion 61 are independent of each other, and do not have an intercommunication orifice between the capacities, such as 62 and 62a which they confine, but each of which on the other hand has two membranes 63, 63a made from a rigid material.

The envelopes 60, 60a are simply stacked one above the other, without any other fixing means than the centering pins 64, 64a.

The capacities 62 and 62a are sealed, filled separately with an incompressible liquid and isolated from each other.

Each envelope 60, 60a must then have its own means for absorbing the shock of a part of the load set down with a certain speed on the resilient support. Two of these means are shown in FIG. 7. The first includes equipping each of its two faces 65 and 65a in contact with the envelopes 60, 60a which are adjacent thereto, such as 60a, with a bearing plate 66 (or 66a) made from a flexible material and having projecting parts, such as 67 and concave parts 68 forming, in an appropriate arrangement, free spaces between the projecting parts 67.

The flexible material forming these plates will be advantageously an elastomer or another plastic material of the same type as the material used for forming the envelopes 60, 60a. It may be adhered to the wall of the envelopes 60, 60a by the fact that it will be manufactured, using a heat process for example, in the same mold as that used for forming these latter.

It will then be readily understood that, when the load supported by cushion 61 increases, the projecting part 67 of the bearing plate 66 (or 66) will be resiliently crushed while extending laterally so as to occupy the free spaces formed by the concave part 68. Thus, the height 69 of each envelope may decrease while generating a stroke for absorbing the shock resulting from the setting down of a load on the resilient support.

The second proper shock absorbing means shown in FIG. 7 includes introducing inside the capacities 62 or 62a which contain an incompressible liquid, hollow sealed spheres 70, whose resilient wall will have a variable geometry depending on the pressure of the liquid which surrounds them. When the pressure of this liquid increases, under the action of an increase in the load supported by cushion 61, the spherical wall of bubbles 70 will undergo an increased compression force and its perimeter will contract under the effect of this force.

The diameter of the bubbles 70 will decrease and, correspondingly, the volume of air which they contain. This reduction of volume of the whole bubbles 70 causing a reduction of the volume of the capacities such as 62, the height of each of the cells, such as 60, 60a, will decrease while generating a stroke absorbing the shock resulting from the setting down of the load on the resilient support.

In order to construct a resilient support of the invention, one or other of these shock absorbing means illustrated in FIG. 7 may be used or else both assemblies.

Other means may also be used, in association or not with these two above mentioned means, such, for example, as the one which includes replacing the incompressible liquid contained in the capacities 62, 62a by a deformable substance, at the limit of the solid state, and having a certain compressibility, such as a silicon gell.

Figure 8:
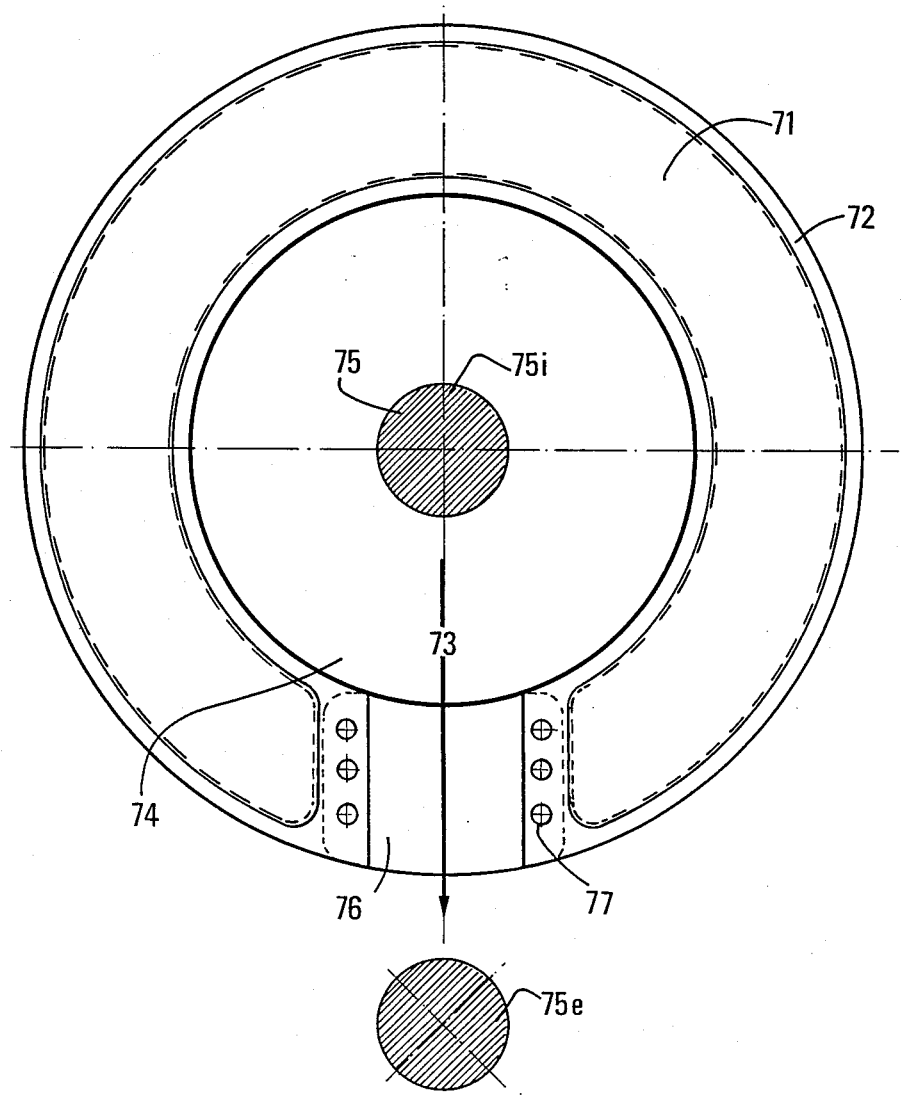
FIG. 8 is a cross sectional view along an axis of another embodiment of the support of the invention where the envelopes and the membranes which form the cushions have the shape of an open ring.

In FIG. 8, another variant of the resilient support of the invention has been shown where the flexible annular envelopes 71 and the annular rigid membrane 72 forming the cushion of the support have an open ring shape which provides a temporary passage 73, between the central well 74 which they surround and the outside.

Through the passage 73, equipment can be removed such as tube 75, installed in well 74 in position 75i so as to place it in position 75e or conversely the cushion may be removed while maintaining the tube 75 in position. The continuity of the annular membrane 72 may be provided by removable fish plates 76 which block the passage 73 and are fixed to the two ends of membranes 72 by a removable fixing means, such for example as bolts 77.

Figure 9:
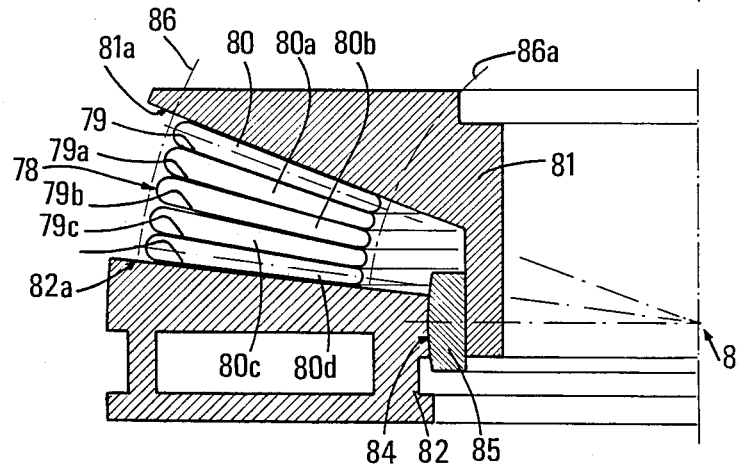
FIG. 9 is a vertical sectional view along an axis of another embodiment of the support of the invention where the membranes which separate the different envelopes of the cushion have a conical shape.

FIG. 9 shows another embodiment of the resilient support of the invention where, in order to increase the transverse stability of cushion 78, the annular membranes 79 and 79c which separate the envelopes 80 to 80d have a conical shape.

It can be seen in this case that it is advantageous for the surfaces 81a and 82a of the upper 81 and lower 82 plates of the resilient support which receive the means fixing the end envelopes 80 and 80d to also be conical. It is also advantageous for these different conical surfaces 81a, 79 to 79c and 82a to have a common apex 83 which is also the center of the spherical surface 84 of the ball joint 85 which centers the two plates 81 and 82 with respect to each other. This apex 83 may also be the center of the two imaginary spheres 86 and 86a between which the cushion 70a is inscribed.

It can be seen that the drawing will be very be very little modified if the surfaces 81a, 79 to 79c and 82a, instead of being conical, have for example a spherical or toric shape.

FIG. 10 shows a sea installation which forms a typical case of application of the resilient annular support of the invention. The resilient support 87 shown schematically here is fixed by its lower plate 88 to a ship 89 used, for example, for drilling the under sea subsoil, the surface of the sea being shown by the line 90.

The upper plate 91 of support 87 has retractable dogs 92 on which are set down successively the sections 93, 93a, 93b, 93c, etc. . . . which form the whole of a drill riser 94. In fact, such a riser is formed by adding or removing successive sections such as 93 to 93d, using a hoisting gear 95 carried by the derrick 96, for lowering or raising the end equipment 97 intended to be connected to the bottom of the sea.

During the lapse of time required for stubbing a new section, or for removing it, the riser 94 is carried by support 87. The deformation of the fluid cushion of this support 87 allows an adaptation between its upper plate 91 temporarily fixed to the above mentioned riser and its lower plate 88 fixed to the ship. This adaptation allows the oscillating movements of the ship 89, which may pivot under the action of the swell as far as the position 89h, for example, whereas, the riser 94 remains substantially vertical under the effect of its swinging stability.

When the riser 94 is lowered at a certain speed using the hoisting gear 95, after addition or removal of a section such as 93d, for placing it on the dogs 92 of support 87, there inevitably occurs a shock which the cushion of said support absorbs as we saw above by a reduction of its height and a temporary increase of the pressure of the fluid or fluids which it confines.

Figure 11:
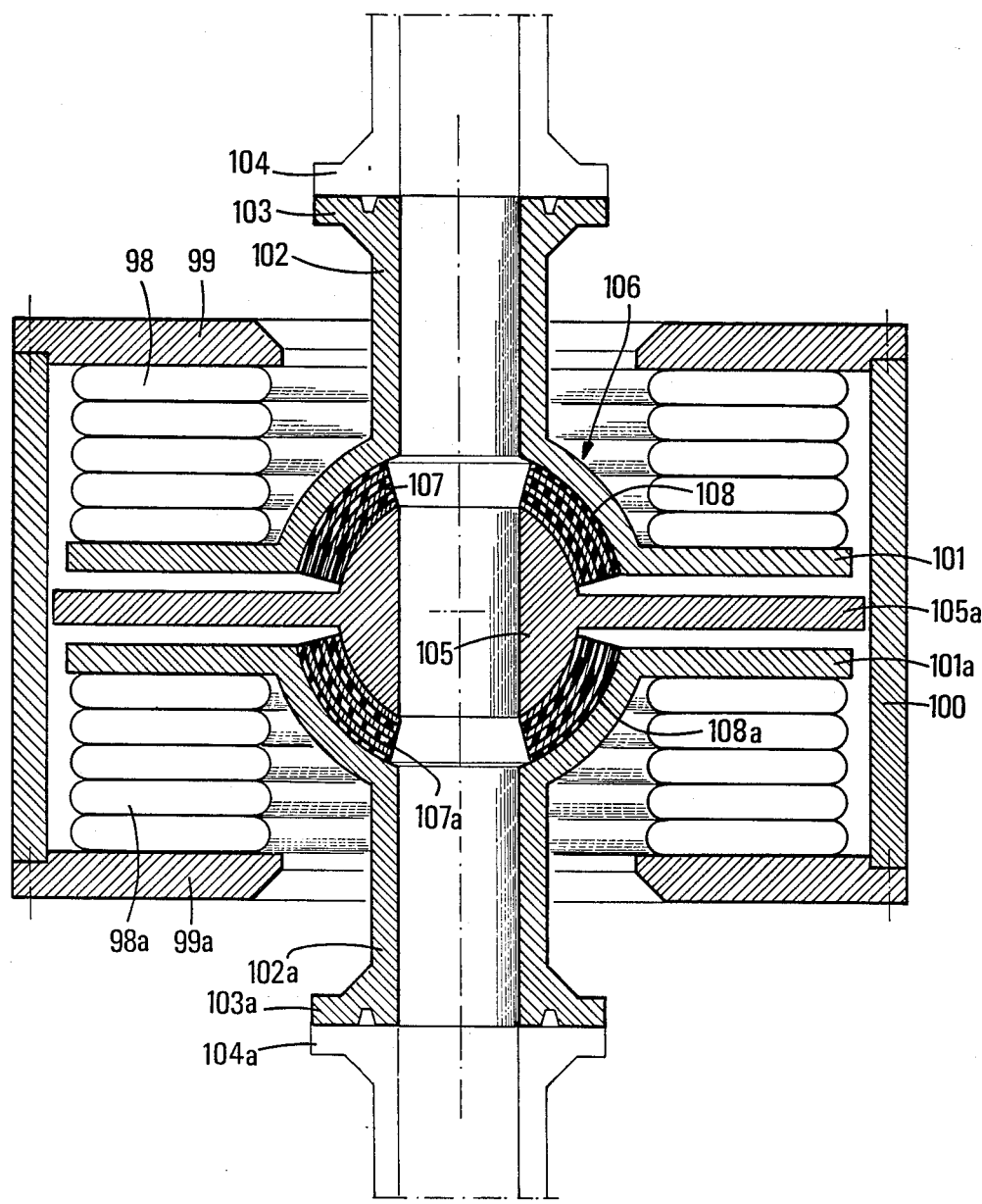
FIG. 11 is a sectional view along a vertical axis of an embodiment of the support of the invention for centrally confining a pressurized fluid duct.

FIG. 11 shows an embodiment of the resilient support of the invention comprising two antagonistic fluid cushions 98 and 98a. The two outer plates 99 and 99a are connected together by a peripheral collar 100, whereas, each of the two inner plates 101 and 101a has an inner chimney 102 (or 102a) ending in a flange 103 (or 103a) for connection with for example two sections 104 and 104a of a riser, not shown, transferring the oil production from an oil field situated at the bottom of the sea to the surface.

These two lower plates are centered with respect to each other by a ball joint 106. Advantageously, the ball joint 106 may be formed by a central spherical ring 105 and two spherical elastomer shells 107 and 107a each of which adheres to the spherical ring 105 and to a spherical concavity 108 (or 108a) formed on each of the inner plates 101 and 101a.

It will then be readily understood that this installation allows the two riser sections 104 and 104a to oscillate with respect to each other in a nutational movement; whereas, a tractive force is transmitted from one to the other by pressurizing the fluid confined in the cushions 98 and 98a. The ball joint 106 also allows this movement of oscillation because of the deformation under shearing forces of its elastomer shells 107 and 107a and fulfills the double function of centering the four plates 99, 99a, 101 and 101a, of the support with respect to each other more particularly by the collar 105a, and of providing the required sealing for the transit of a pressurized fluid between the riser sections 104 and 104a. Advantageously, in the case where the fluid pressure is very high, the elastomer shells 107 and 107a may be reinforced by interpositioning rigid shells between two elastomer layers so as to form a rubber-metal stratiform.

Figure 12:
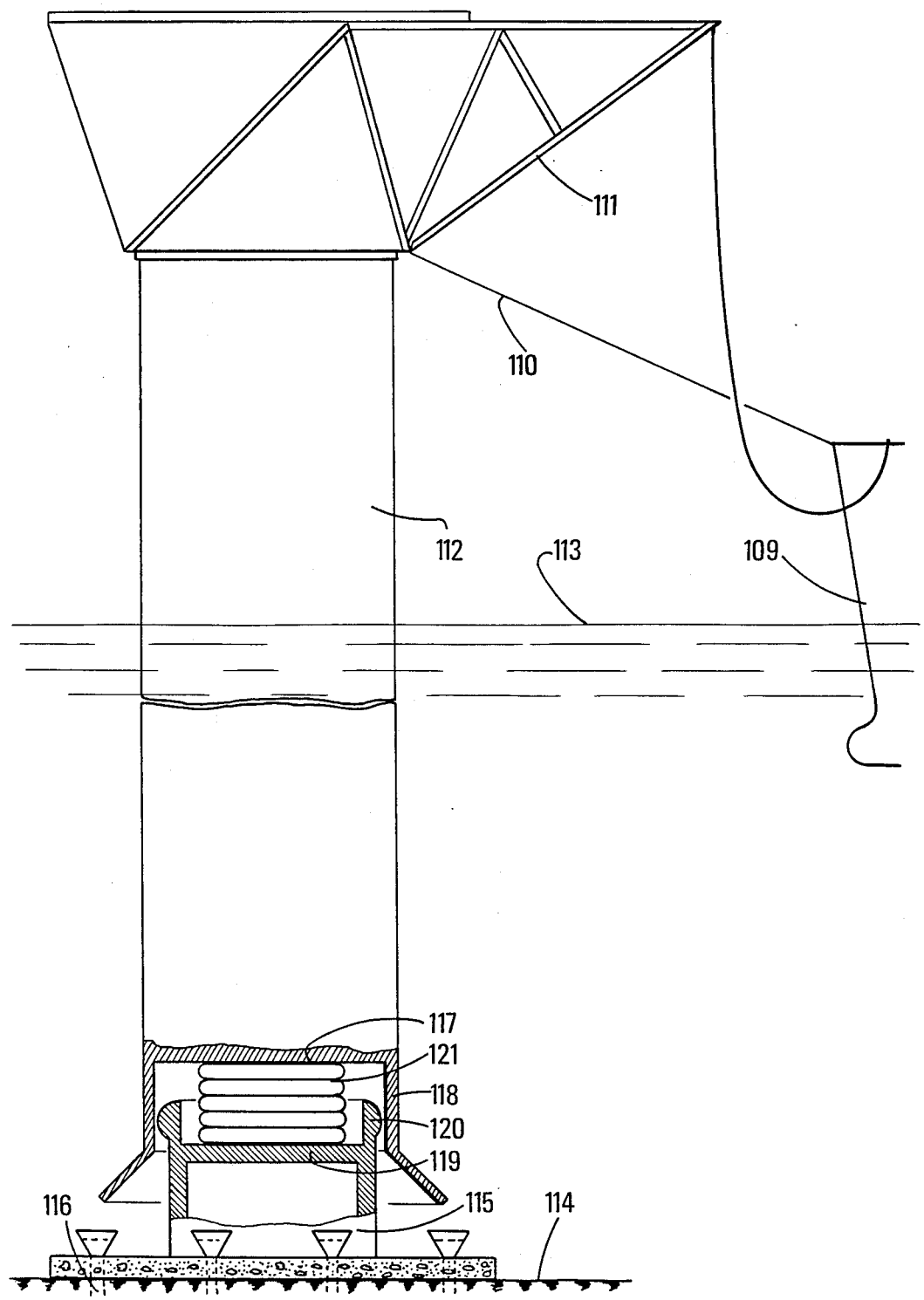
FIG. 12 is a vertical sectional view along an axis of an oscillating riser including a modification of the support of the invention for bearing on the bottom of the sea.

FIG. 12 illustrates another typical case of application of the resilient support of the invention for forming the articulations situated at the base of an oscillating riser for mooring a ship at sea 109.

The ship is moored by a hawser 110 on the rotating part 111 which covers the riser 112. This riser emerges from the surface of the sea shown by the line 113 and extends to the vicinity of the bottom shown by the line 114. A submarine base 115 is laid on the bottom and held firmly anchored, for example, by piles 116 driven in.

Riser 112 is fixed to this base by an articulation system quite similar to the resilient support of the invention illustrated in FIG. 1 and having an upper plate 117, equipped with a sleeve 118, which is none other than the lower base of the riser, and an upper plate 119, equipped with a spherical annular drum 120, which forms part of base 115. The spherical annular drum 120 is centered inside the sleeve 118 so that the riser may oscillate depending on the movements of the sea, its base being retained in a fixed position at the bottom of the sea, this position being imposed by base 115.

In this case of application, the riser 112 has a natural buoyancy less than its weight, and its bears on the bottom of the sea through a circular cushion 121 situated in the center of the ball joint 120 between the plates 117 and 119.

The bearing load of the riser is supported by the pressurization of fluid contained in the different envelopes of this cushion.

Figure 13:
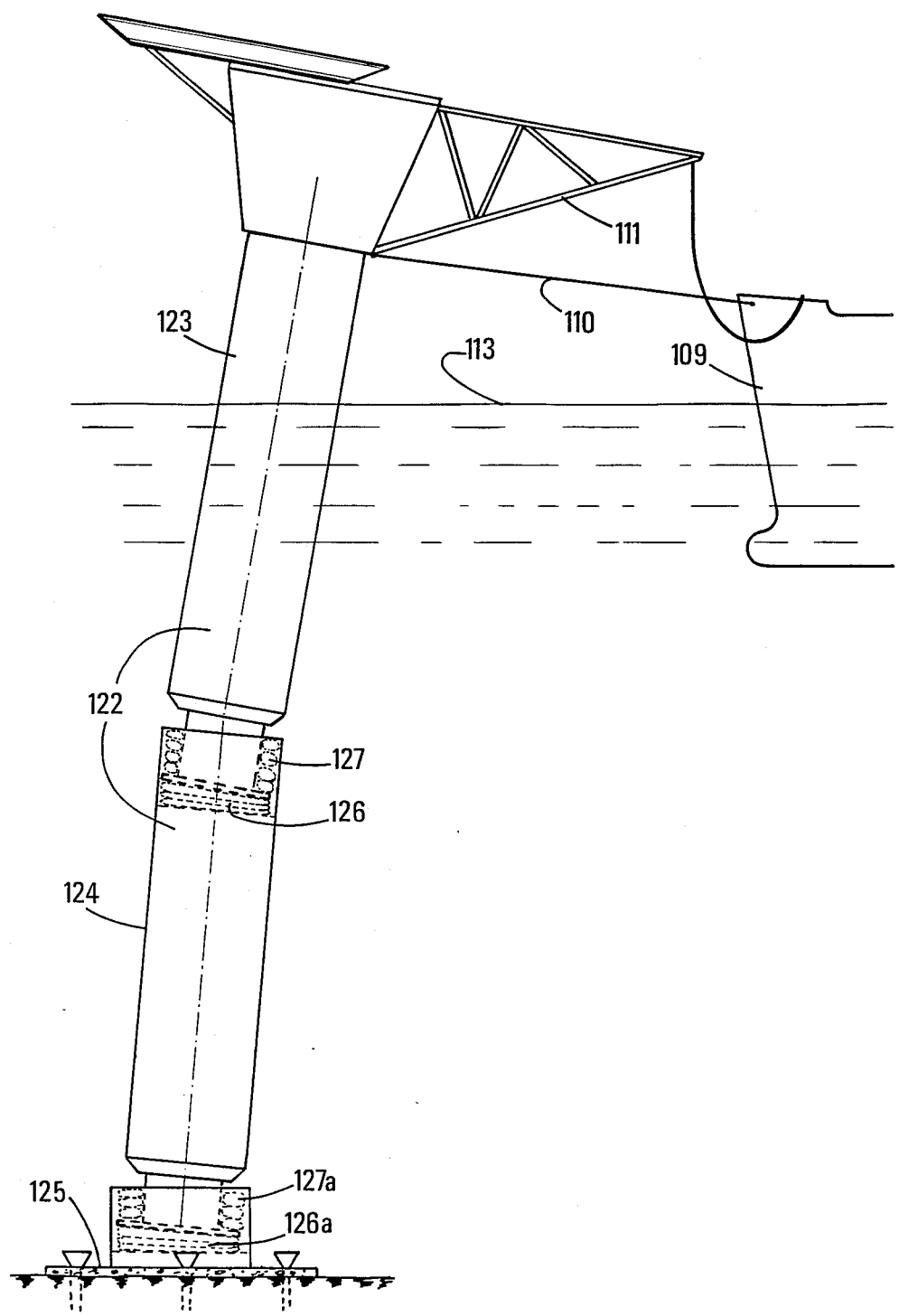
FIG. 13 is a vertical sectional view along an axis of a multiarticulated oscillating riser including a modification of the support of the invention.

FIG. 13 shows a particular case of application of the resilient support of the invention for forming an oscillating riser for mooring a ship at sea when the water depth is very great, the riser 122 being then, for this reason, formed of several sections such as 123 and 124 articulated with each other and with the fixed base 125 at the bottom of the sea.

Since the weight of this riser may in some cases, at the time of installation, for example, be greater than its buoyancy and in other cases, during use for example, less than its buoyancy, the articulation will be formed a support of the invention having two antagonistic cushions: a first circular fashion 126 and 126a for supporting the downward loads and a second cushion of an annular shape 127 and 127a for transmitting the upward forces.

Figure 14:
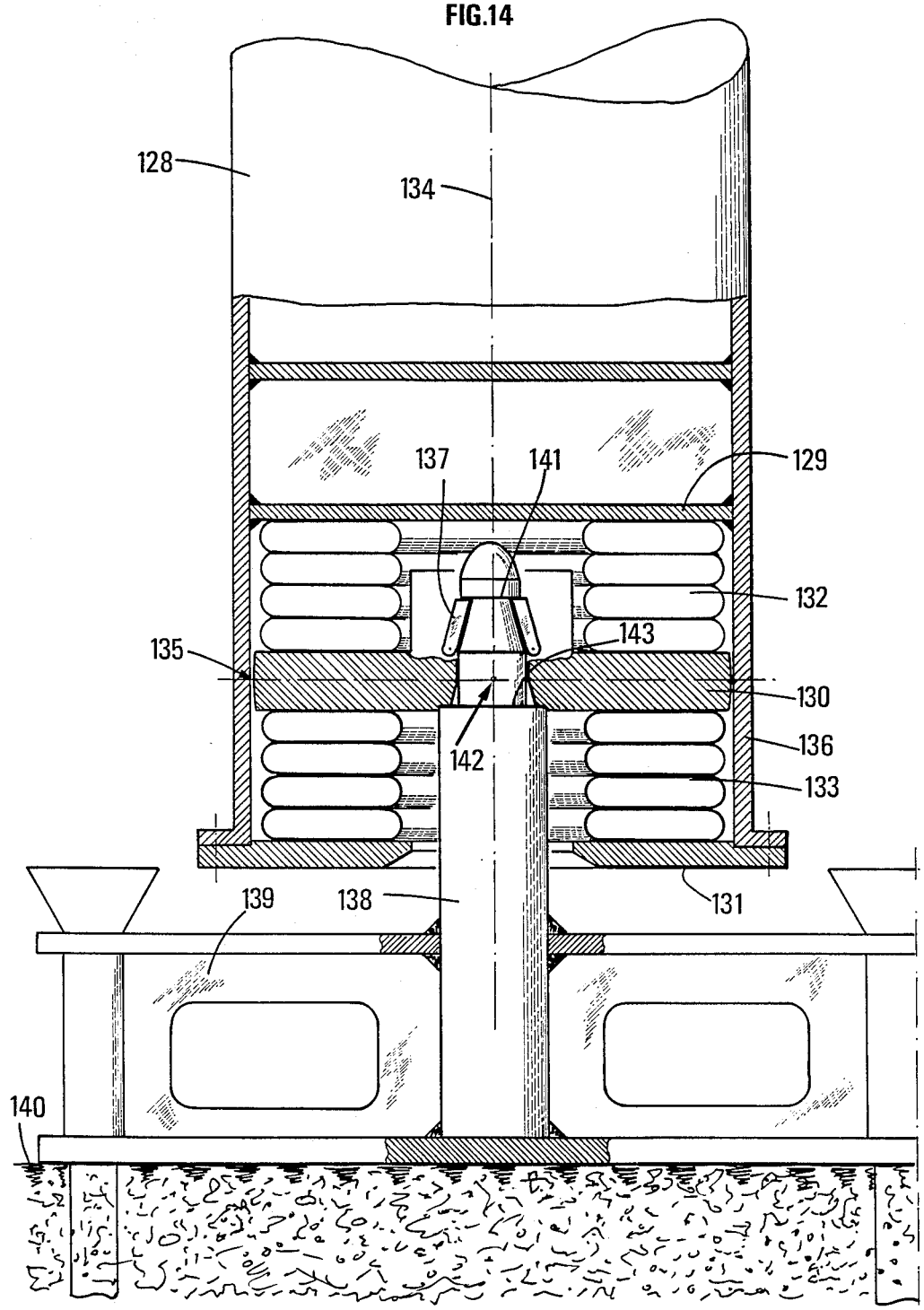
FIG. 14 shows, in a vertical sectional view along an axis, an enlarged detail of construction of the lower base of the riser, showing a support of the invention with two cushions.

The architecture of this articulation will be better understood with reference to FIG. 14 which shows in greater detail an articulation of this type in which the oscillating riser 128 is equipped at its base with three plates 129, 130 and 131 between which are installed two annular fluid cushions of the invention 132 and 133.

Plates 129, 131 are integral with the riser, whereas plate 130, inserted between the two deformable cushions 132 and 133, has a freedom of movement in translation and nutation with respect to the axis 134 of the riser, because of the ball joint 135 which provides centering with respect to the sleeve 136 extending downwards the structure of riser 128.

The plate 130 also has connection means, for example, retractable dogs 137, on a vertical centering post 138 secured to base 139 for connection with the bottom of the sea, shown by line 140.

The operation of such a device is easy to understand. With base 139 preinstalled on the bottom, the riser 128 is floated on the site to bring it above the centering post 138 then, made heavy by ballasting, it descends.

Post 138 in which is formed a groove 141 penetrates inside the connector carried by plate 130 and the dogs 137 close when penetrating inside this groove.

The load of the weighted riser, as well as the positioning shock are transmitted from plate 129 to cushion 132 and plate 130 which bears on the collar 143 of post 138.

Then the riser is lightened by unballasting and its buoyancy becomes greater than its weight, so that an upward pull is transmitted from plate 131 to the cushion 133 and plate 130.

The plate 130 transmits this tractive force to the base 139 through the dogs 137 which bear inside the groove 141 of post 138. In other configurations, the riser 128 may oscillate with a nutational movement about the center 142 of ball joint 135 because of the deformability of the fluid cushions 132 and 133.

The advantages of the present invention result from the possibility of forming resilient ball joint supports capable of supporting very high loads or structures of very considerable weight, for example of more than a thousand tons, without hindering their mobility.

It provides more especially solutions to the problems of installing in a sea environment equipment and structures subjected to the movements of the swell.

It also has the advantage of combining in the same member a ball joint articulation and a shock absorbing cylinder and technological means insensitive to corrosion, wear and fatigue.

Its applications are diverse and multiple. It may be used for example, as a means for suspending and handling a riser for drilling undersea subsoil or for transferring the oil production towards the surface of the sea, or as an articulation of a sea structure fixed to the bottom of the sea, such as an oscillating riser for mooring a ship.

I claim:

1. A resilient ball joint support comprising two plates, at least one ball joint for connecting the two plates so as to be movable with respect to each other and for centering the plate with respect to each other, at least one cushion disposed between the two plates and being formed of at least one sealed envelope confining at least one fluid pressurized by an action of a load applied between said plates so that substantially no torque occurs upon a transmission of the load between said plates, wherein a plurality of cushions are provided and are formed of a superimposition of sealed envelopes of substantially circular contour having peripheral edges assuming a substantially toroidal shape and said at least one ball joint is disposed about said sealed envelopes coaxially therewith.

2. A resilient ball joint support, comprising two plates, at least one ball joint for connecting two plates so as to be movable with respect to each other and for centering the plates with respect to each other, at least one cushion disposed between the two plates and being formed of at least a sealed envelope confining at least one fluid pressurized by an action of a load applied between said plates so that substantially no torque occurs upon a transmission of the load between said plates, wherein a plurality of cushions are provided, with each cushion being formed of a superimposition of annular envelopes having inner and outer edges adapted to assume a substantially toric or toroidal shape, and wherein said at least one ball joint is disposed inside said envelopes and concentrically therewith and has a cylindrical orifice such that said support has an annular shape surrounding said central orifice.

3. A resilient ball joint support comprising two plates, at least one ball joint for connecting the two plates so as to be movable with respect to each other and for centering the plates with respect to each other, at least one cushion disposed between the two plates and being formed of at least a sealed envelope confining at least one fluid pressurized by an action of a load applied between said plates so that substantially no torque occurs upon a transmission of the load between said plates, wherein a plurality of cushions are provided, each of said plurality of cushions is formed of a superimposition of sealed envelopes, disposed side by side about a circle concentric with said at least one ball joint, and wherein at least one duct connects the sealed envelopes, and valve means close said at least one duct so that fluid capacities confined by all or part or said plurality of cushions may be either in intercommunication or temporarily isolated from each other.

4. A resilient ball joint support comprising two plates, at least one ball joint for connecting the two plates so as to be movable with respect to each other and for centering the plates with respect to each other, at least one cushion disposed between the two plates and being formed of at least a sealed envelope confining at least one fluid pressurized by an action of a load applied between said plates so that substantially no torque occurs upon a transmission of the load between said plates, wherein a plurality of cushions are provided and wherein at least one intermediate plate is interposed between said two plates and separated from each of the two plates by at least one of said plurality of cushions, and said intermediate plate is centered with respect to one of the at least two plates through said at least one ball joint.

5. The resilient ball joint support as claimed in one of claims 2 to 4, wherein each of said annular envelopes includes at least one layer of cables disposed substantially radially and embedded in a sheet of a flexible sealing material to which said cables adhere, and each of said envelopes is connected to another envelope adjacent thereto by at least one annular membrane of a rigid material to which said envelopes are fixed by bonding, said at least one annular membrane being situated at one end of said cushion having means for sealingly fixing to said two plates and said intermediate plate of said resilient support.

6. The resilient ball joint support as claimed in claim 5, wherein at least one orifice means is provided in said at least one annular membranes for enabling a communication between the respective envelopes of the same cushion.

7. The resilient ball joint support as claimed in claim 5, wherein said at least one annular membrane has one of a flat washer shape or a truncated cone shaped sleeve, spherical or toric.

8. The resilient ball joint support as claimed in claim 5, wherein said annular envelopes and said annular membrane have an open ring shape forming a temporary passage between the central orifice 10 which they surround and the outside, the continuity of said membranes being provided by removable fish plates which lock said temporary passage.

9. The resilient ball joint support as claimed in one of claims 2 to 4, wherein each of said envelopes is provided, on both faces in contact with the envelopes adjacent thereto with an elastomer bearing plate having projecting parts and concave parts, said concave parts forming spacers required for the free spreading of the projecting parts which are crushed under and effect of an increase of the carried load.

10. A resilient ball joint comprising two plates, at least one ball joint for connecting the two plates so as to be movable with respect to each other and for centering the plates with respect to each other, at least one cushion disposed between the two plates and being formed of at least a sealed envelope confining at least one fluid pressurized by an action of a load applied between said plates so that substantially no torque occurs upon a transmission of the load between said plates, wherein the fluid confined by the sealed envelope is at least particularly a deformable substance and has a certain compressibility such as a silicon gel.

11. A resilient ball joint support comprising two plates, at least one ball joint for connecting the two plates so as to be movable with respect to each other and for centering the plates with respect to each other, at least one cushion disposed between the two plates and being formed of at least a sealed envelope confining at least one fluid pressurized by an action of a load applied between said plates so that substantially no torque occurs upon a transmission of the load between said plates, wherein the fluid confined by the sealed envelope is a mixture in appropriate portions of a substantially incompressable liquid and a compressible gas whose compression allows said two plates to draw close together and the energy caused by the placing of the load to be absorbed.

12. The resilient ball joint support as claimed in claim 11, wherein a duct connects the contained in the sealed envelopes of each of said cushions to at least one associated cylinder or pneumatic accumulator containing a compressible gas brought before use to a pressure level forming an initial calibration.

13. The resilient ball joint support as claimed in claim 11, wherein said compressible gas occupying partly a capacity of the sealed envelopes of said cushions or a subsidiary capacity communicating with said capacity of the envelopes, is confined in at least one flattenable and sealed flexible sleeve for isolating it from the liquid occupying the other part of this capacity, said compressible gas being brought before use to a calibration pressure producing inflation of said sleeve until, with the pressure of said liquid becoming higher than said calibration pressure, said sleeve tends to assume a flat shape.

14. The resilient ball joint support as claimed in claim 11, wherein said compressible gas is confined in at least one hollow and sealed sphere having a resilient wall with a geometry variable as a function of the pressure of said fluid which surrounds it.

15. A resilient ball joint support comprising two plates, at least one ball joint for connecting the two plates so as to be movable with respect to each other and for centering the plates with respect to each other, at least one cushion disposed between the two plates and being formed of at least a sealed envelope confining at least one fluid pressurized by an action of a load applied between said plates so that substantially no torque occurs upon a transmission of the load between said plates, the at least one ball joint is formed by a sleeve integral with one of said two plates and has a cylindrical bore, with a spherical drug integral with the other plate and being adapted to slide and pivot inside said bore, each of said envelopes includes at least one layer of cables disposed substantially radially and embedded in a sheet of a flexible sealing material to which said cables adhere, and each of said envelopes is connected to another envelope adjacent thereto by at least one membrane of a rigid material to which said envelopes are fixed by bonding, said at least one annular membrane being situated at one end of said cushion having means for sealingly fixing to said two plates and said intermediate plate of said resilient support.

16. The resilient ball joint as claimed in claim 15, when at least one orifice means is provided in said at least one annular membrane for enabling a communication between the respective envelopes of the same cushion.

17. The resilient ball joint support as claimed in claim 15, wherein said at least one annular membrane has one of a flat washer shape of a truncated cone shaped sleeve, spherical or torque.

18. The resilient ball joint support as claimed in claim 15, wherein said angular envelopes and said at least one annular membrane have an opening ring shape forming a temporary passage between the central orifice which they surround and the outside, the continuity of said membranes being provided by removable fish plates which lock said temporary passage.

19. A resilient ball joint support comprising two plates, at least one ball joint for connecting the two plates so as to be movable with respect to each other and for centering the plates with respect to each other, at least one cushion disposed between the two plates and being formed of at least a sealed envelope confining at least one fluid pressurized by an action of a load applied between said plates so that substantially no torque occurs upon a transmission of the load between said plates, at least one ball joint is formed by a sleeve integral with one of said two plates and has a cylindrical bore, with a spherical drum integral with the other plate and being adapted to slide and pivot inside said bore, wherein said envelope is provided, on both faces in contact with the envelopes adjacent thereto, with an elastomer bearing plate having projecting parts and concave parts, said concave parts forming spacers required for the free spreading of the projecting parts which are crushed under an effect of an increase of a carried load.

* * * * *